United States Patent
Kikuchi et al.

(10) Patent No.: US 7,813,655 B2
(45) Date of Patent: Oct. 12, 2010

(54) SIGNAL WAVEFORM DETERIORATION COMPENSATOR

(75) Inventors: Nobuhiko Kikuchi, Tokyo (JP); Shigenori Hayase, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 450 days.

(21) Appl. No.: 10/557,613

(22) PCT Filed: Dec. 16, 2003

(86) PCT No.: PCT/JP03/16106
§ 371 (c)(1),
(2), (4) Date: Nov. 22, 2005

(87) PCT Pub. No.: WO2004/107610
PCT Pub. Date: Dec. 9, 2004

(65) Prior Publication Data
US 2007/0065162 A1      Mar. 22, 2007

(30) Foreign Application Priority Data
May 27, 2003   (JP) .............................. 2003-149513

(51) Int. Cl.
*H04B 10/00* (2006.01)
(52) U.S. Cl. ...................... 398/209; 398/208
(58) Field of Classification Search ............. 398/17, 398/25–29, 147, 149, 202–214
See application file for complete search history.

(56) References Cited

U.S. PATENT DOCUMENTS

| | | | |
|---|---|---|---|
| 5,999,289 A * | 12/1999 | Ihara et al. .................. | 398/147 |
| 6,307,988 B1 * | 10/2001 | Eggleton et al. .............. | 385/37 |
| 6,320,687 B1 | 11/2001 | Ishikawa | |
| 6,411,416 B1 * | 6/2002 | Ooi et al. ..................... | 398/141 |
| 6,501,580 B1 * | 12/2002 | Ishikawa et al. ............ | 398/148 |
| 6,587,242 B1 | 7/2003 | Shake et al. | |
| 6,603,890 B2 * | 8/2003 | Khosravani et al. .......... | 385/11 |
| 6,694,273 B2 * | 2/2004 | Kurooka et al. .............. | 702/69 |
| 6,907,199 B2 * | 6/2005 | Koch et al. .................... | 398/81 |

(Continued)

FOREIGN PATENT DOCUMENTS

EP        0 998 066 A2     10/1999

(Continued)

OTHER PUBLICATIONS

International Search Report of PCT/JP2003/016106 mailed Mar. 30, 2004.

(Continued)

*Primary Examiner*—Agustin Bello
(74) *Attorney, Agent, or Firm*—Stites & Harbison PLLC; Juan Carlos A. Marquez, Esq.

(57) ABSTRACT

The waveform deterioration detection range is broadened and multi bit rates can be handled. A chromatic dispersion compensator (or polarization mode dispersion compensator) (102) receives a waveform-deteriorated NRZ optical signal entered through an input fiber (101) and compensates it. On the other hand, an optical detector (106) receives part of output light and a sampling circuit (A/D converter) (107) performs asynchronous sampling of received waveform intensity. A control circuit (110) calculates the nth even moment (n is 4 or more) from an obtained waveform amplitude histogram and performs control to minimize its value.

18 Claims, 10 Drawing Sheets

U.S. PATENT DOCUMENTS

| | | | |
|---|---|---|---|
| 6,956,917 B2 * | 10/2005 | Lenosky | 375/350 |
| 6,965,736 B1 * | 11/2005 | Hanik et al. | 398/27 |
| 7,088,925 B1 * | 8/2006 | Noe | 398/147 |
| 7,123,845 B2 * | 10/2006 | Matsuyama | 398/208 |
| 7,174,098 B2 * | 2/2007 | Yokoyama | 398/33 |
| 7,200,328 B2 * | 4/2007 | Shake et al. | 398/10 |
| 7,215,721 B2 * | 5/2007 | Hietala et al. | 375/317 |
| 7,307,569 B2 * | 12/2007 | Vrazel et al. | 341/144 |
| 7,340,187 B2 * | 3/2008 | Takeshita | 398/209 |
| 2001/0024307 A1 * | 9/2001 | Franco et al. | 359/161 |
| 2001/0046077 A1 * | 11/2001 | Akiyama et al. | 359/161 |
| 2002/0123851 A1 * | 9/2002 | Kurooka et al. | 702/69 |
| 2002/0126352 A1 * | 9/2002 | Shake et al. | 359/124 |
| 2003/0011837 A1 | 1/2003 | Shake et al. | |
| 2003/0086144 A1 * | 5/2003 | Chou et al. | 359/246 |
| 2004/0037572 A1 | 2/2004 | Matsuyama | |
| 2004/0179837 A1 * | 9/2004 | Bock et al. | 398/25 |
| 2007/0065162 A1 * | 3/2007 | Kikuchi | 398/208 |

FOREIGN PATENT DOCUMENTS

| | | |
|---|---|---|
| JP | 11-088260 | 9/1997 |
| JP | 11-88260 | 9/1997 |
| JP | 2000-201137 | 3/1999 |
| JP | 2002-261692 | 3/2001 |
| JP | 2003-90766 | 6/2002 |
| JP | 2003-090766 | 6/2002 |
| JP | 2004-80701 | 8/2002 |
| WO | WO 03/005620 A2 | 1/2003 |

OTHER PUBLICATIONS

"Electronics Letters An International Publication", The Institution of Electerical Engineers, vol. 35 No. 5, Mar. 4, 1999, 3 Pages Total.

Sano, Akihide, et al. "Extracted-Clock Power Level Monitoring Scheme for Automatic Dispersion Equalization in High-Speed Optical Transmission Systems", IEICE Trans. Commun., vol. E84-B, No. 11 Nov. 2001, pp. 2907-2914.

Muller, K. et al. "Application of Amplitude Histograms for Quality of Service Measurements of Optical Channels and Fault Identification", European Conference on Optical Communication, vol. 1, 1998, pp. 707-708.

Shake, I., "Bit rate flexible quality monitoring of 10 to 160 Gbit/s optical signals based on optical sampling technique", Electronics Letters, vol. 36 No. 25, Dec. 7, 2000, 2 pages total.

Japanese Office Action dated Feb. 10, 2009 for Japanese Application 2003-149513.

Office Action (Notice of Rejection) from Japanese patent Office dated Dec. 1, 2009.

* cited by examiner

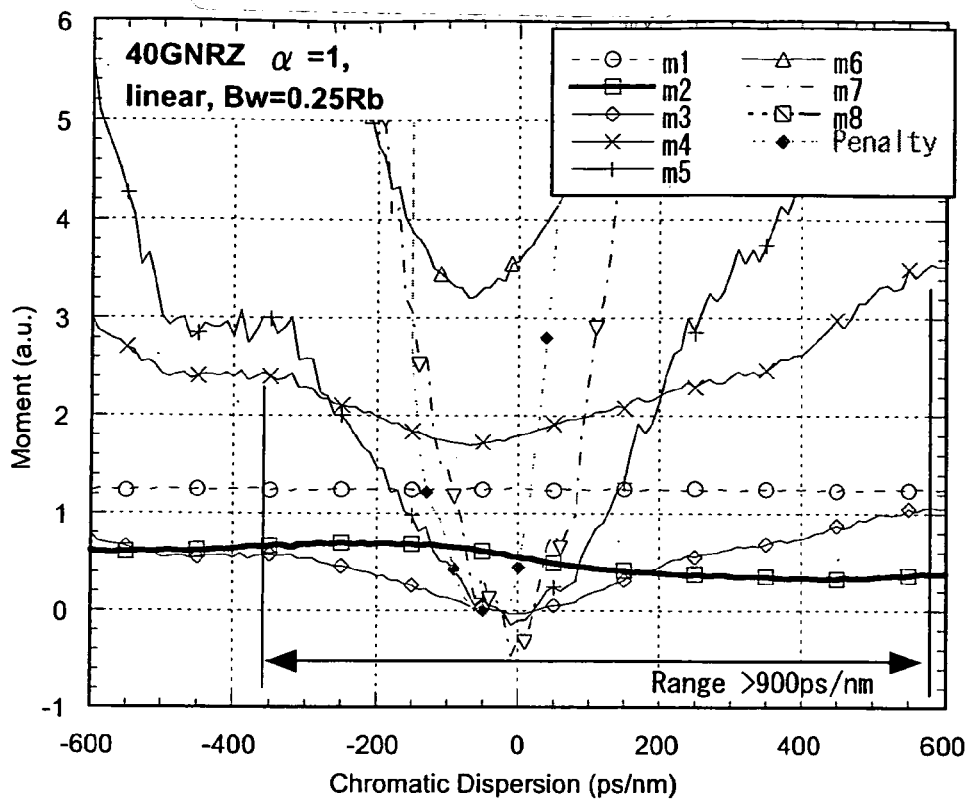
Fig.12 A NRZ
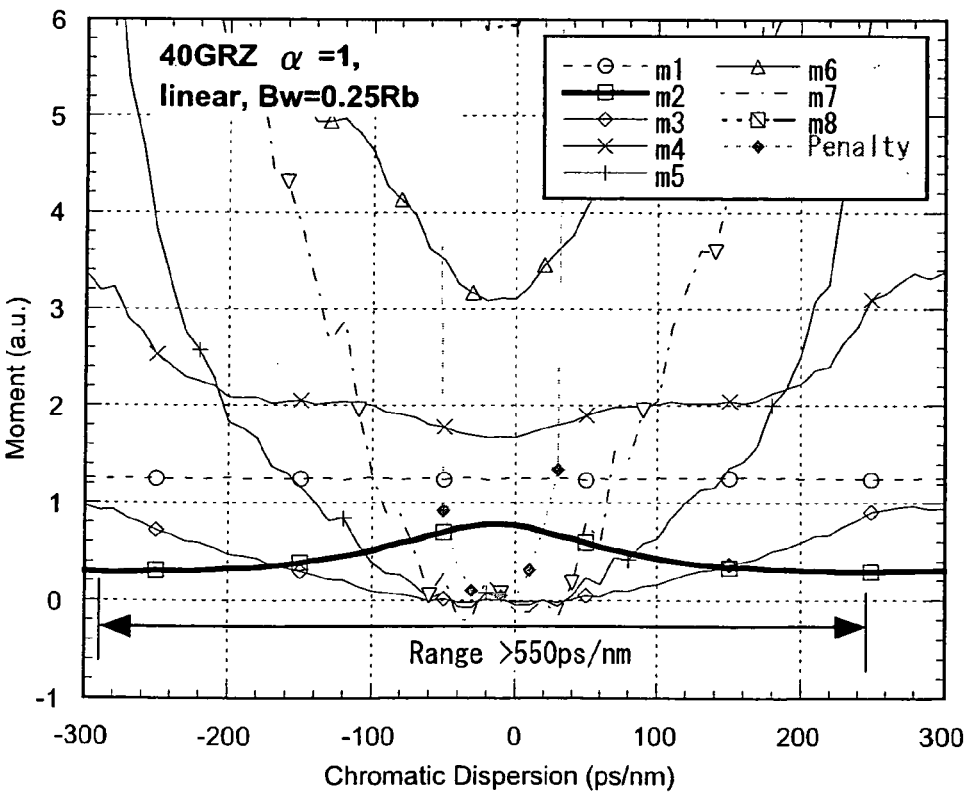
Fig.12 B RZ

SIGNAL WAVEFORM DETERIORATION COMPENSATOR

TECHNICAL FIELD

The present invention relates to optical data transmission using optical fibers and more particularly to a compensator which compensates for deterioration of signal waveform during transmission.

BACKGROUND ART

In ultrahigh speed optical communications, such phenomena as chromatic dispersion, polarization mode dispersion and bandwidth limitation in transmission line optical fibers or components in use are significant limiting factors for transmission rates and transmission distances. "Chromatic Dispersion" (CD) refers to a phenomenon that light with different wavelengths travels through an optical fiber at different speeds (hereinafter what is merely called "dispersion" refers to chromatic dispersion). It is known that the optical spectrum of an optical signal modulated at a high speed contains different wavelength components and these components arrive at the receiving end at different times under the influence of chromatic dispersion, resulting in a large waveform distortion in the optical waveform after transmission. In order to avoid the influence of such chromatic dispersion, a technique called "chromatic dispersion compensation" is under consideration (hereinafter what is merely called "dispersion compensation" refers to chromatic dispersion compensation). Dispersion compensation is a method of preventing waveform distortion of received light in which an optical device having chromatic dispersion characteristics opposite to those of optical fibers used in a transmission line is placed in an optical transmitter or optical receiver to negate the chromatic dispersion characteristics of the optical fibers. Dispersion compensation techniques under consideration include the use of dispersion compensation fibers having chromatic dispersion opposite to that of the transmission line, optical interferometers, optical circuits, optical Fiber Bragg Gratings (FBG), optical transversal filters and so on. Another approach under consideration is a technique in which an electric compensation circuit such as an electric transversal filter is placed in an optical receiver for the purpose of waveform deterioration compensation.

Particularly it is known that when an optical signal with 10 Gbps or more is transmitted several hundred kilometers or more, the problem of change in the amount of chromatic dispersion is caused by optical fiber temperature change, and thus studies have been made on a variable dispersion compensation technique which varies the amount of compensation depending on the change. Variable dispersion compensators which are known to be used in this technique are, for example, those which vary the amount of chromatic dispersion by giving a temperature gradient or distortion to optical Fiber Bragg Grating or by changing the temperature or phase for an optical interferometer system. In the case of the above electric transversal filter, it is possible to provide variable compensation by varying the filter characteristics. This type of variable dispersion compensator is used to compensate for insufficiency of chromatic dispersion tolerance of a high-speed optical transmitter-receiver. For example, the maximum dispersion tolerance of a 40 Gbps transmitter or receiver is very small (80 ps/nm) and for widely used single-mode fibers (SMF), this tolerance level just covers 4 km. Hence, in transmission using a fixed dispersion compensation device, it would be necessary to replace the device with a device with a different compensation amount every 4 km transmission distance in order to make the total dispersion in the transmission line 80 ps/nm or less. This means a serious problem that many types of dispersion compensators must be used, resulting in increase in the compensator management and their maintenance cost and longer time required for the manufacture and installation of the compensators. On the other hand, it might become necessary to measure the amount of chromatic dispersion and the length of the transmission line with high accuracy or the user could not change the transmission path easily or many other problems might occur.

With this background, studies have been made on an automatic dispersion compensation technique in which a variable dispensation compensator is placed just before an optical receiver to detect the amount of deterioration of received waveform or transmission characteristics and vary the amount of chromatic dispersion automatically so as to optimize the received waveform. This technique makes it possible that even a high-speed optical transmitter-receiver works when the user connects the equipment, without taking chromatic dispersion in the transmission line into consideration, as in the conventional method; namely it realizes "plug & play."

On the other hand, "Polarization Mode Dispersion" (PMD) refers to a phenomenon that optical signals on two principal axes (TE and TM) inside an optical fiber travel at different speeds. It is known that as a consequence, optical signals distributed to the two principal axes TE and TM arrive at the receiving end at different times, causing a large waveform distortion. In order to avoid such influence of polarization mode dispersion, a technique called PMD compensation has been studied. PMD compensation refers to a technique that a device having polarization mode dispersion opposite to that of the transmission line is inserted in the transmission line to prevent optical waveform distortion. Another approach under consideration is a technique in which an electric compensation circuit such as a transversal filter is placed in an optical receiver to compensate for PMD-induced waveform deterioration. Unlike chromatic dispersion, the PMD amount in an optical fiber transmission line is known to change momentarily according to the ambient temperature or input state of polarization; therefore, automatic PMD compensation which detects the amount of deterioration and optimizes compensation to minimize the deterioration is indispensable.

"Bandwidth limitation" refers to a phenomenon that particular frequency components such as an optical signal high frequency component is lost because of bandwidth limits on a multi-mode optical fiber used as a transmission line, a semiconductor laser or photodiode used for generating or receiving optical signals, IC or the like, and leads to received optical waveform deterioration in high speed optical transmission. As for bandwidth limitation, studies have been made on a technique in which a compensation circuit such as an optical or electric transversal filter is placed to compensate for the weakened high frequency component; however, since this phenomenon also largely depends on the mode of input into the optical fiber, optical fiber condition, transmission distance and the optical spectrum characteristics or modulation characteristics of light sources of individual optical transmitters, the amount of compensation cannot be predetermined and automatic compensation is indispensable in which the amount of deterioration should be detected and compensation should always be optimized to minimize the deterioration. This compensation is effective not only for bandwidth limitation but also for some deterioration induced by chromatic dispersion or polarization mode dispersion and initial waveform inter-symbol interference.

For automatic control by many variable optical/electric compensators used in optical fiber transmissions, some technique of detecting the amount of deterioration of waveform or transmission characteristics is needed. FIG. 2 shows the configuration of a conventional automatic chromatic dispersion compensator which uses a clock extraction/maximum control method as a typical method for waveform deterioration detection in variable dispersion compensation or PMD compensation.

An optical digital data signal which has deteriorated due to optical fiber chromatic dispersion or polarization mode dispersion in optical fiber transmission enters a conventional automatic chromatic dispersion compensator 102 through an input optical fiber 101. As it passes through a variable optical chromatic dispersion compensator 102, the optical signal is subjected to compensation for its deterioration induced by chromatic dispersion, before being outputted through an output optical fiber 105. When the compensator 102 is a PMD compensator, it is also possible to realize a variable PMD compensator with an almost equivalent configuration. Part of the compensated optical signal is branched by an optical splitter 104 and leaded to an optical detector 106 and converted into an electric signal. The electric signal is rectified by a rectifier 121 and the clock component is extracted from the received signal by filtering the output signal by a bandpass filter 122 whose transmission center bandpass is equal to the bit rate. Since the intensity of this clock signal is almost proportional to the eye-opening of the received waveform, a control signal 103 obtained from a maximum control circuit 123 is sent to the variable optical chromatic dispersion compensator 102 to change the amount of chromatic dispersion and perform maximum control so as to maximize the clock signal, so that the waveform deterioration is maintained minimum at all times.

Control of a variable chromatic dispersion compensator by clock extraction as mentioned above has been reported, for example, in "Extracted-Clock Power Level Monitoring Scheme for Automatic Dispersion Equalization in High-Speed Optical Transmission Systems" (IEICE Trans. Commun., Vol; E84-B, No. 11 Nov. 2001). In this paper, FIG. 6 shows the relation between clock component intensity and transmission line chromatic dispersion in 20 Gbps NRZ (Non Return to Zero)/RZ (Return to Zero) systems. For example, in case of the NRZ signal indicated by solid line in FIG. 6B, the clock signal intensity (vertical axis) is maximum at a chromatic dispersion of −150 ps/nm (horizontal axis) and the waveform at this point is the best. When the amount of chromatic dispersion is +50 ps/nm to −350 ps/nm, namely in the range of about 400 ps/nm, the clock intensity curve is of the single-peak type, or has an upward peak at the dispersion of −150 ps/nm, which means that the best waveform is always obtained by controlling compensation by the variable chromatic dispersion compensator so as to maximize the clock intensity.

Non-patent Document 1

"Extracted-Clock Power Level Monitoring Scheme for Automatic Dispersion Equalization in High-Speed Optical Transmission Systems" (IEICE Trans. Commun., Vol; E84-B, No. 11 Nov. 2001)

DISCLOSURE OF THE INVENTION

However, the above clock maximum control system has a problem that as waveform deterioration increases, the clock signal intensity loses its single-peak feature making it impossible to "pull in" for the best waveform. For example, according to the experimental result shown in FIG. 6 in the above document, the amount of dispersion which can be pulled in is in the range of about 400 ps/nm for 20 Gbps NRZ signals and 250 ps/nm for RZ signals. These values are in inverse proportion to the square of the bit rate and, on the basis of 40 Gbps bit rate, they are translated into 100 ps/nm (NRZ) and 80 ps/nm (RZ) respectively. This almost corresponds to the dispersion tolerance of a 40 Gbps receiver. In other words, it can be said that the detection range is such that a waveform which a receiver can receive can be pulled in toward the best point. In order to implement a practical Plug & Play system, it is desirable that the waveform deterioration detection range should be as wide as possible; for example, it should cover the compensation range of a variable dispersion compensator or a variable PMD compensator. For instance, in 40 Gbps variable dispersion compensation, in order to achieve user-friendliness equivalent to that of a 10 Gbps transmitter-receiver, it is necessary to provide a dispersion tolerance equivalent to that of the 10 Gbps transmitter-receiver (>800 to 500 ps/nm). More specifically, the detection range should be at least ±250 ps/nm, which suggests the need for a waveform deterioration detection method with a wide detection range.

The above problem exists similarly when FIG. 2 shows an automatic PMD compensator. The polarization mode dispersion tolerance of an ordinary NRZ transmitter-receiver is about one third of the bit width (for example, the bit width for an NRZ signal with a bit rate of 40 Gbps is 25 ps and the polarization mode dispersion tolerance of the transmitter-receiver is approx. 7.5 ps). In the waveform deterioration detection method based on clock extraction, the maximum detection range is ½ bit. The reason for this is that a waveform with polarization mode dispersion is the sum of waveforms transmitted on two principal axes in an optical fiber transmission line and thus if the amount of polarization mode dispersion is exactly 1 bit, the deteriorated optical signal waveform returns to a 2-value waveform and a clock signal whose intensity is the same as when the amount of polarization mode dispersion is zero is generated. In other words, the range of polarization mode dispersion for single-peak clock signal intensity is 0 to ½ bit. The amount of polarization mode dispersion for an optical fiber is usually in proportion to the square of transmission distance and its value is 0.1 ps/km$^{1/2}$ or so. However, optical fiber transmission lines which have been installed include poor optical fibers whose polarization mode dispersion is large and the maximum polarization mode dispersion of such optical fibers is said to be as large as 2.0 ps/km$^{1/2}$. For these optical fibers, the amount of polarization mode dispersion in a transmission line distance of 100 km only may be as large as 20 ps (80% of the bit width in case of 40 Gbps). Therefore, a waveform deterioration detection method with a wide detection range is needed for a PMD compensator as well.

A similar waveform deterioration detection method is indispensable for compensation for bandwidth deterioration as mentioned earlier. The reason is that although control by clock signal intensity detection is possible for such compensation, detection range insufficiency might occur as in chromatic dispersion or PMD compensation as mentioned above.

Another problem with the conventional clock extraction system is that the detection characteristics of the detection circuit largely depends on the optical signal bit rate and cannot be used for compensation for optical signals with different bit rates. The number of optical signal bit rate types is increasing and there are a wide variety of bit rate types even in 10 Gbps systems: for example, 9.95 Gbps for SONET signals, 10.7 Gbps or 12.6 Gbps for transmission systems based on FEC (Forward Error Correction), and 12.5 Gbps for 10 G Ether. Since the clock extraction system requires the use of a bandpass filter 122 with a very narrow bandwidth (Q-value is several hundreds), it is difficult for one circuit to cope with such a wide variety of bit rates. While the number of product types must be decreased for cost reduction, it is necessary to increase the convenience for customers who purchase products. Hence, the need for a multi-bit rate waveform deterioration detection circuit of an automatic compensator is growing.

What has been cited above is a case of clock maximum control in chromatic dispersion compensation. Another conventional technique that has been widely used is minimum-BER control which minimizes the bit error ratio (BER) of received data as one transmission characteristic index. Like the above clock extraction system, this control technique has a problem of insufficiency of the waveform deterioration detection range. This is because a control signal cannot be obtained only when clock extraction is made properly in the receiver and the receiver recognizes digital data normally to some extent. This detection range is considerably insufficient as in clock extraction maximum control and it is difficult to cope with multi bit rates as well. A further problem is that since it is only after reception of bit error information from the receiver that the compensator can be controlled, it is difficult to separate the compensator and the receiver as independent products.

An object of the present invention is to solve the above problem in the waveform deterioration detection method used for variable chromatic dispersion compensation, variable PMD compensation or variable bandwidth compensation and provide a practical waveform deterioration compensator.

The above object can be achieved by a system in which an optical detector converts an optical digital data signal into an electric digital data signal, a sampling circuit is used to acquire an amplitude histogram by sampling the amplitude of the electric digital data signal asynchronously with a data signal bit timing, and a signal corresponding to the amount of waveform deterioration is extracted from the histogram in a control circuit, thereby obtaining a control signal which minimizes the waveform deterioration. Particularly, the amount of compensation by a variable optical signal waveform deterioration compensation circuit or a variable electric signal waveform deterioration compensation circuit can be controlled by this control signal to minimize the signal waveform deterioration automatically.

For the above signal waveform deterioration compensator, a chromatic dispersion compensation circuit, a PMD compensation circuit or a bandwidth deterioration compensation circuit or a compensation circuit which includes a transversal filter or a decision feedback equalizer is used so that compensation for a deterioration factor in optical fiber transmission can be effectively made.

In order to cope with multi bit rates, asynchronous sampling must be guaranteed even if data signals width plural different bit rates are inputted. This can be achieved by ensuring that the sampling frequency of the sampling circuit is relatively prime to all values that the bit rates can have, or that the sampling timing of the sampling circuit is random, or that the sampling frequency is changed to plural different frequencies, or that the sampling frequency varies temporally.

A wider range of waveform deterioration detection and compensation can be made by ensuring that the frequency bandwidth of the path from the optical detector to the sampling circuit is below one half of the bit rate of the data signal.

The control circuit calculates the second or higher statistical moment in the histogram and controls the signal waveform deterioration compensation circuit so that the calculated statistical moment is the maximum, minimum or a fixed value, thereby permitting effective detection of waveform deterioration and automatic waveform deterioration compensation. If the data signal is of the NRZ type, the control circuit calculates the fourth or higher even moment as a statistical moment and controls the signal waveform deterioration compensation circuit so as to minimize it or calculates the second moment and controls the signal waveform deterioration compensation circuit so as to make it a fixed value. If the data signal is of the RZ type, the control circuit calculates the second even moment as a statistical moment and controls the signal waveform deterioration compensation circuit so as to maximize it or calculates the fourth or higher even moment and controls the signal waveform deterioration compensation circuit so as to minimize it.

Also, in order to prevent malfunctioning and increase the waveform deterioration detection range or sensitivity, arrangements are made that the control circuit stops control of the signal waveform deterioration compensation circuit stops when there is no optical signal, and performs its control when there is an optical signal. Besides, it is effective that the control circuit switches control algorithms so as to first control the signal waveform deterioration compensation circuit according to a low statistical moment after turning on the power or receiving an external command signal or upon change from absence of an optical signal to presence of an optical signal, and then use a higher statistical moment or a control signal generated by another method.

This specification incorporates the contents of the specification of Japanese Patent Application No. 2003-149513, on which priority of this application is based, and/or drawings appended thereto.

BRIEF DESCRIPTION OF DRAWINGS

FIG. 12 shows the effect of bandwidth reduction of a waveform deterioration detector according to the present invention.

BEST MODE FOR CARRYING OUT THE INVENTION

Next, embodiments of the present invention will be described referring to the accompanying drawings.

Figure 1:
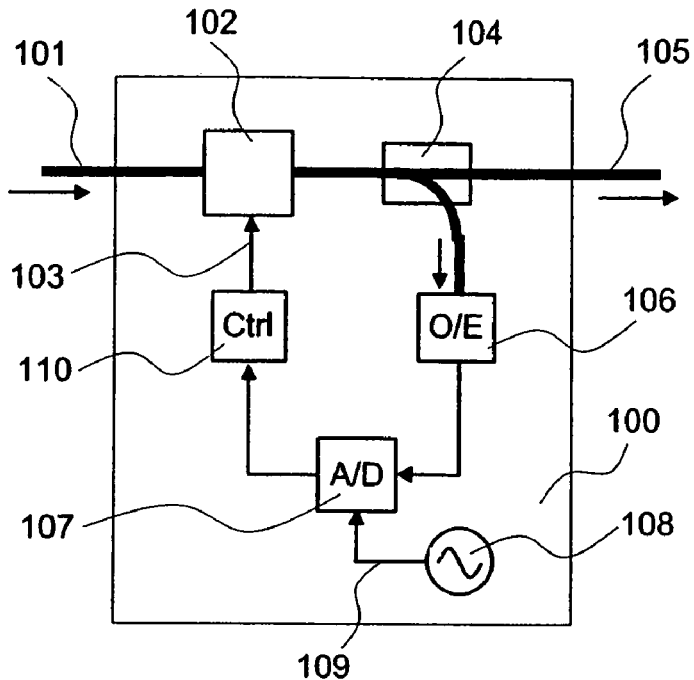
FIG. 1 is a block diagram showing a first embodiment of the present invention.
Figure 2:
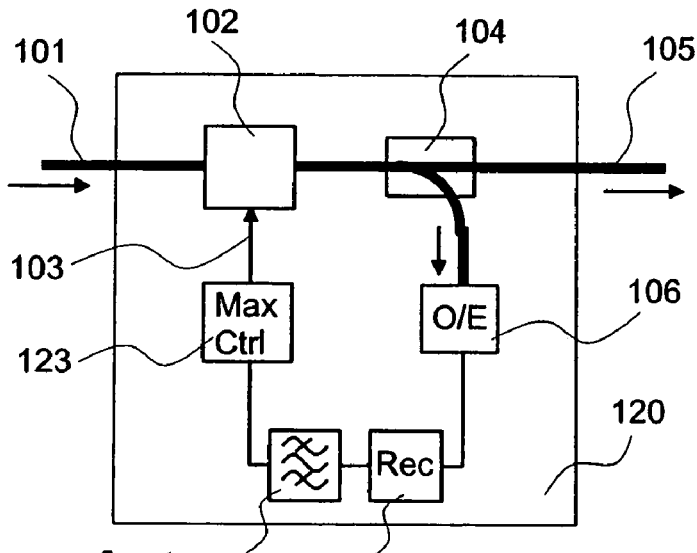
FIG. 2 is a block diagram showing a conventional automatic chromatic dispersion compensator.

FIG. 1 is a block diagram showing a first embodiment of the present invention and illustrates the configuration of an automatic chromatic dispersion compensator 100 according to the present invention, as an example.

An optical digital data signal entered through an input optical fiber 101 undergoes compensation for deterioration caused by chromatic dispersion as it passes through a variable optical chromatic dispersion compensator 102 and the compensated optical signal is outputted through an output optical fiber 105. Part of the compensated optical signal is branched by an optical splitter 104 and converted into an electric signal by an optical detector 106 before entering an A/D converter 107 as a sampling circuit. The A/D converter 107 samples the amplitude of the input electric signal according to the timing of a sampling clock 109 which is generated by a clock source 108 and asynchronous with the data signal. A control circuit 110 generates a chromatic dispersion control signal 103 matched to the waveform deterioration of the received signal, from an amplitude histogram obtained by accumulation of digital amplitude data for a given time period, sends this control signal to the variable optical chromatic dispersion compensator 102 and controls the amount of chromatic dispersion of the variable optical chromatic dispersion compensator 102 so as to minimize the waveform deterioration. The automatic chromatic dispersion compensation function is thus implemented. By using a PMD compensator as the compensator 102, a variable PMD compensator can be configured almost in the same way.

Figure 3:
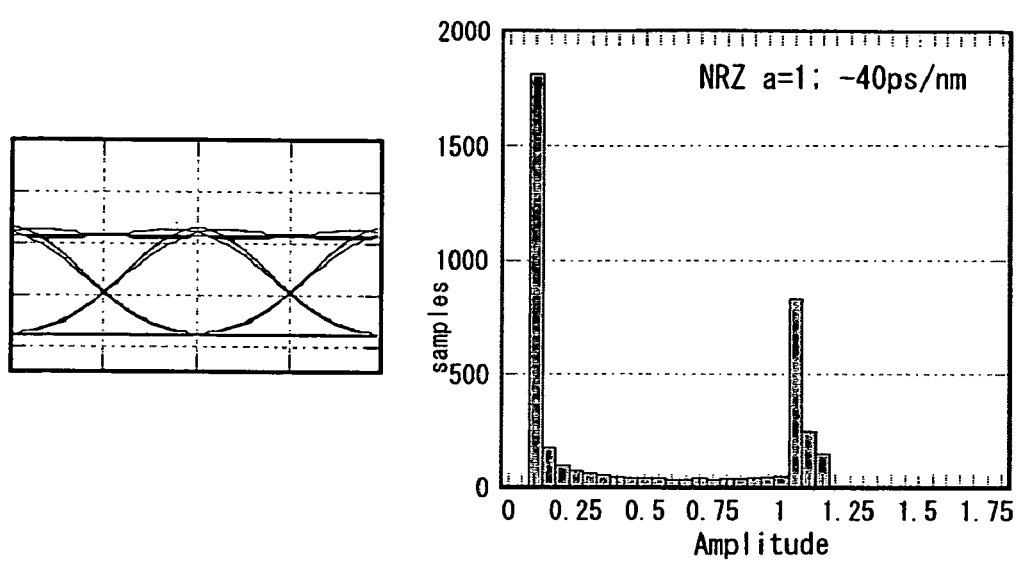
FIG. 3 shows the relation between received waveforms and asynchronous amplitude histograms, which is the fundamental principle of the present invention.
Figure 3:
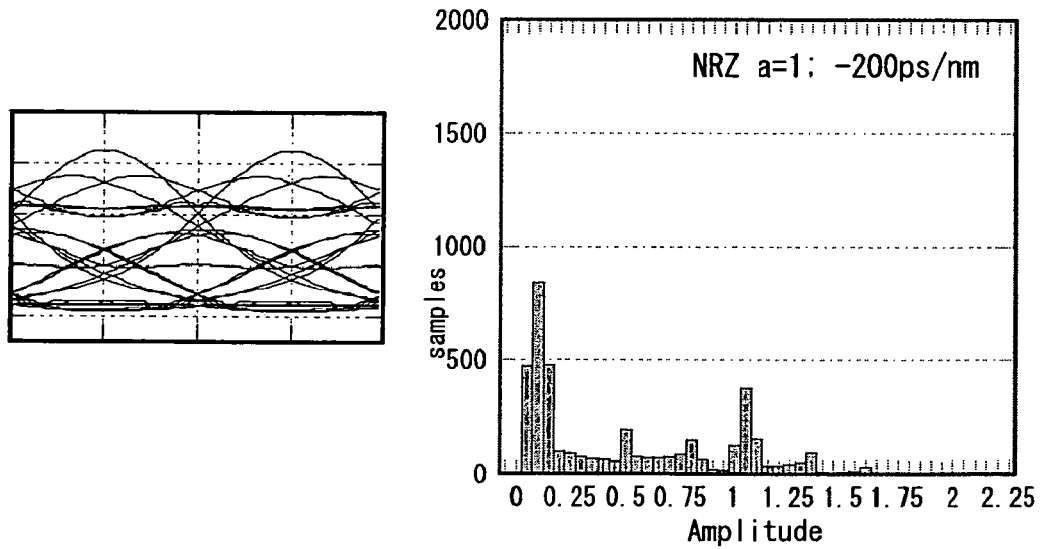

FIG. 3 shows, in 40 Gbps NRZ optical signal transmission, received waveforms (left) and an amplitude histogram obtained by sampling received waveforms asynchronously (right). FIG. 3A shows a case that the amount of chromatic dispersion in a transmission line is set at −40 ps/nm in order to minimize the deterioration of received waveform. It is found that there is virtually no inter-symbol interference in the received waveforms (left) and the amplitude histogram (right) has a sharp peak at a mark level (1) and a space level (0) which are normalized. On the other hand, FIG. 3B shows that when the amount of chromatic dispersion is −200 ps/nm, a serious waveform deterioration occurs. It is apparent that there is a significant waveform distortion as shown on the left and accordingly sharp peaks are lost in the histogram (right) and the distribution is flat. From this, it is understood that the received signal waveform's amplitude histogram data and the degree of waveform deterioration are closely related to each other. In the present invention, it is essentially important to perform waveform amplitude sampling as mentioned above asynchronously with bit timing. This is because, by taking data on waveform deterioration not only in the waveform center but also in shoulder parts which correspond to bit boundaries, waveform change can be detected with high sensitivity.

Figure 4:
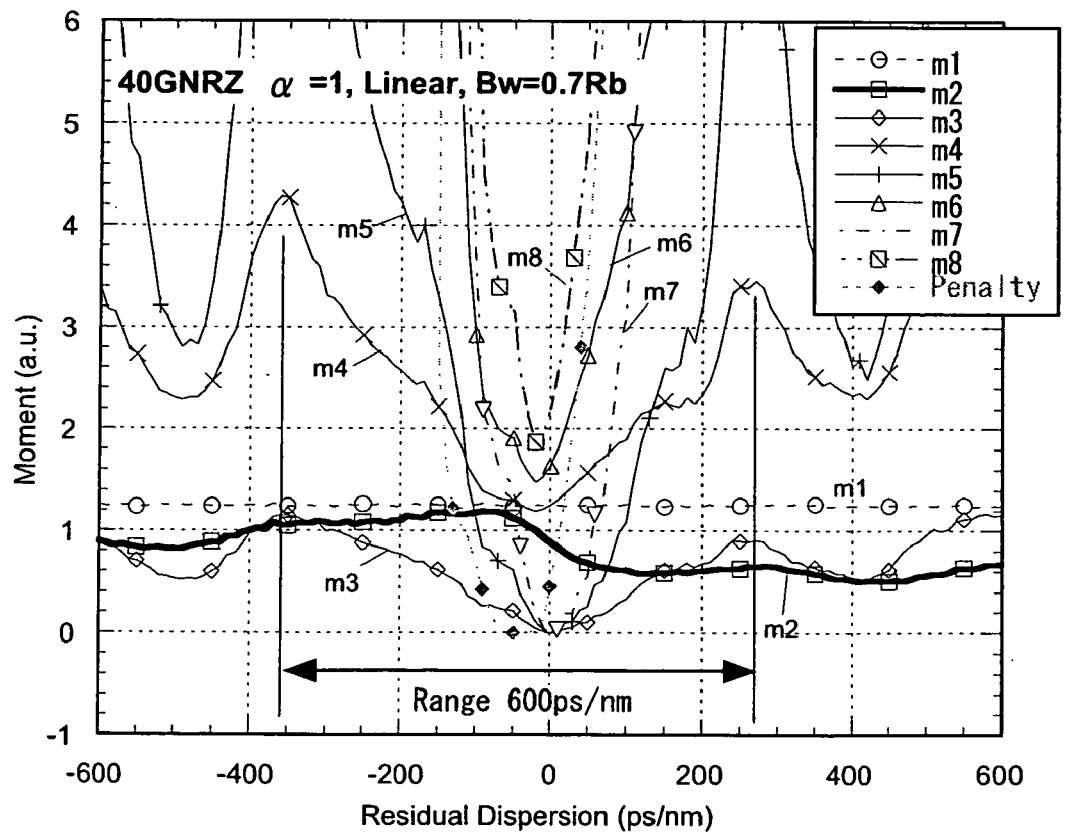
FIG. 4 shows the relation between the amount of chromatic dispersion and nth moment according to the present invention.

For the control circuit 110, it is necessary to obtain an index indicating the amount of waveform deterioration from the histogram. The present invention uses the nth statistical moment in the amplitude histogram as such an index. FIG. 4 shows the relation between nth statistical moment in a histogram obtained by sampling asynchronously with received waveforms and chromatic dispersion for 40 Gbps NRZ optical signal transmission, demonstrating the effect of the present invention. In this example, optical signal waveforms were sampled randomly about 10,000 times and the average value of amplitude $\mu$ as the first moment and standard deviation $\sigma$ as the second moment were calculated from the resulting amplitude histogram. Then, nth moment $m_n$ normalized with these values was calculated using the following equation (where $X_k$ denotes the value of each amplitude sample and K denotes the number of samples):

$$m_n = \frac{1}{K} \cdot \sum_{k=1\ldots K} \left(\frac{X_k - \mu}{\sigma}\right)^n$$

Curves m1 to m8 in the figure respectively show the results of plotting the first to eighth waveform moments. Small curve irregularities in the graph are attributable to distribution unevenness caused by random sampling and the curves can be smoothened by taking a larger number of samples. The dotted line marked with black rhombic signs represents a deterioration in the received waveform eye-opening as calculated in dB; the smaller this value is, the smaller the waveform deterioration is. More specifically, the waveform deterioration is the minimum at the point on the horizontal axis where the amount of chromatic dispersion is −40 ps/nm or so; it is apparent that as the distance from this point increases, the waveform deterioration becomes larger, as can be understood from the figure. The figure also indicates that while the first moment has a fixed value, the values of the second and higher moments largely change according to chromatic dispersion and thus can be used to minimize waveform deterioration.

For example, in case of the third or higher odd moments, their values are the smallest when the chromatic dispersion is zero and as N becomes larger, the curves become steeper. Hence, the chromatic dispersion zero point can be attained by controlling so as to minimize the third or higher odd moments. The reason that this control is possible is that odd moments correspond to the vertical symmetry of received waveform amplitude distribution. For instance, the third statistical moment is called skewness and an attempt to minimize the skewness value is equivalent to an attempt to make the amplitude distribution vertically symmetric as far as possible. Generally, the received waveform is most'symmetric vertically when chromatic dispersion or PMD is zero; thus the chromatic dispersion zero point is a control point.

It is also possible to use the second moment for control and in the case shown in FIG. 4, by controlling so that the value is fixed at 1.0, feedback to an almost optimum waveform point can be made. The waveform deterioration detection range corresponds to the zone of the second moment curve which is sloping down to the right, and the range is approx. 180 ps/nm.

In case of the fourth or higher even moments, their values are the smallest at a point around −40 ps/nm where the waveform is the best, and the curves have downward peaks in extensive zones at both sides of this point. Called kurtosis, the fourth moment represents the degree of peakedness of a statistical distribution. To minimize this value means to divide an amplitude distribution into two extremes, 0 and 1, which corresponds to minimum waveform deterioration. For example, in the fourth moment curve (m4 in the figure), there is a downward peak around 600 ps/nm, which implies that the waveform deterioration is minimized over a range about six times wider than in the conventional clock extraction system (100 ps/nm).

These statistical moments are universal normalization parameters which represent the states of statistical distributions and offer advantages that they are not influenced by change in gain or loss in the receiver caused by signal level variation or ageing, decision timing error, the presence/absence of optical signal noise and the like and they can be easily calculated even for waveforms which have lost an eye opening point and have too deteriorated to perform clock extraction. Consequently, they have a feature that the waveform deterioration detection range is far wider than in other methods. Particularly when even moments are used, the control point is not the chromatic dispersion zero point but the point of minimum waveform deterioration and thus compensation can also be made for deterioration factors other than chromatic dispersion, polarization mode dispersion and bandwidth deterioration. For example, if self-phase modulation as a non-linear effect of an optical fiber occurs, the amount of chromatic dispersion required to obtain the optimum received waveform is different, but when an even moment is used for control according to the present invention, optimum control for deterioration prevention is performed in a way to cover the influence of a non-linear effect. Regarding the influence of signal noise, the influence of signal noise is a spread between the 0 and 1 levels of the signal and its influence on the above moments is small; since averaging is induced by increasing the number of sampling times, there is no substantial influence of signal noise on the action of the present invention.

Figure 5:
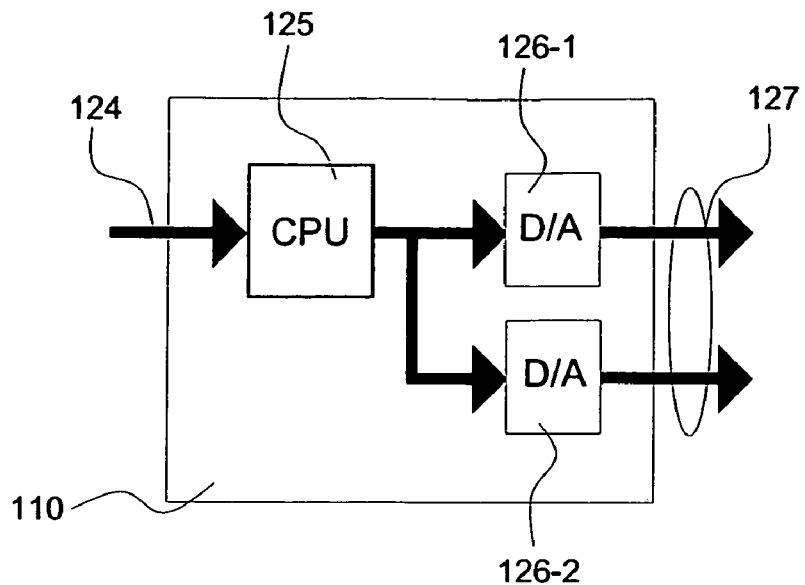
FIG. 5 is a block diagram showing a control circuit 110 according to the present invention.
Figure 6:
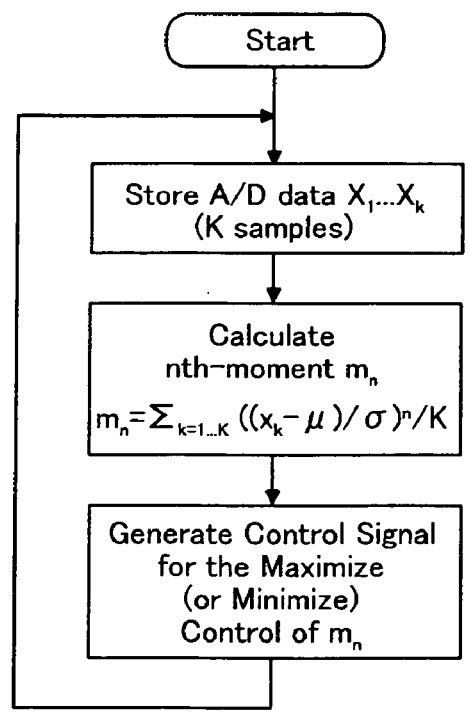
FIG. 6 shows an operation algorithm of the control circuit 110 according to the present invention.

These statistical moments can be easily calculated by arithmetic processing through a processing unit (CPU) located in the control circuit 110. FIG. 5 shows the configuration of the control circuit 110 as an example and FIG. 6 shows an example of its operation algorithm.

The control circuit 110 receives amplitude sample value Xi as an output of the sampling circuit (A/D converter) 107 through a sampling data input terminal 124. The processing unit 125 accumulates such data until the number of sample values is K, then calculates nth moment of each sample value Xi. The processing unit 110 further sets a value on D/A converters 126-1 and 126-2 in order to control the variable optical chromatic dispersion compensator 102 to make any of nth moments maximum or minimum or a fixed value, so that a control signal is outputted through a control signal output terminal 127. When necessary, a sampling timing signal such as a sampling clock may be directly sent to the processing unit or the like for use as a timing signal for counting of samples or calculation.

Although two D/A converters 126-1 and 126-2 are used to output two sets of control signals in this example, this depends on the number of control signals for the compensator to be controlled or the number of compensators in use. For example, transversal optical filters or PMD compensators generally have a plurality of control terminals and when compensation is made for polarization mode dispersion, chromatic dispersion and bandwidth deterioration simultaneously or when two compensators which have different compensation ranges are cascade-connected, a plurality of control signals are needed as well. For control of a simple variable dispersion compensator, one control signal may be sufficient.

The maximum/minimum control algorithm used in the control circuit 110 is not limited as far as it is a method which is generally used for maximum/minimum control. For example, it may be the hill-climbing method, the maximum gradient method or a single or multiple variable control method such as control signal dithering which is as described in textbooks of control engineering. For example, nth moment maximum or minimum control can be performed with the following procedure: each of plural control signals is changed step by step by a given amount each time and change in the nth moment is measured and plural control signal sets (vectors) are changed in a way to maximize its gradient (positive or negative).

An application example of a waveform asynchronous histogram which is similar to the present invention is described in "Quality Monitoring of Optical Signals Influenced by Chromatic Dispersion in a Transmission Fiber using Averaged Q-Factor Evaluation" (IEEE Photonics Technology Letters, Vol. 13, No. 4, April 2001). This document suggests that the Q-value (S/N ratio) which indicates signal quality can be detected even under the influence of chromatic dispersion, which is irrelevant to waveform deterioration compensator control for which the present invention is intended. The purpose of detecting the Q-value is to find the ratio of signal intensity to noise intensity from the waveform histogram, and is, in itself, different from the purpose of the present invention, detection of waveform distortion. For example, the above document states that signal levels 0 and 1 are decided from two peaks in a histogram and middle level signals are discarded by threshold processing to calculate the ratio of signal intensity to noise component (spread between levels 0 and 1). In contrast, the present invention does not require decision of levels 0 and 1 and threshold processing because statistical moments are automatically calculated; and the invention can be applied even to a case that the waveform is too distorted to determine the peaks. In addition, noise itself brings about virtually no influence on statistical moments which are calculated in the present invention. Both the approaches are quite different in the sense that the present invention positively uses middle level signals between 0 and 1 as a measure of the degree of waveform deterioration.

Figure 7:
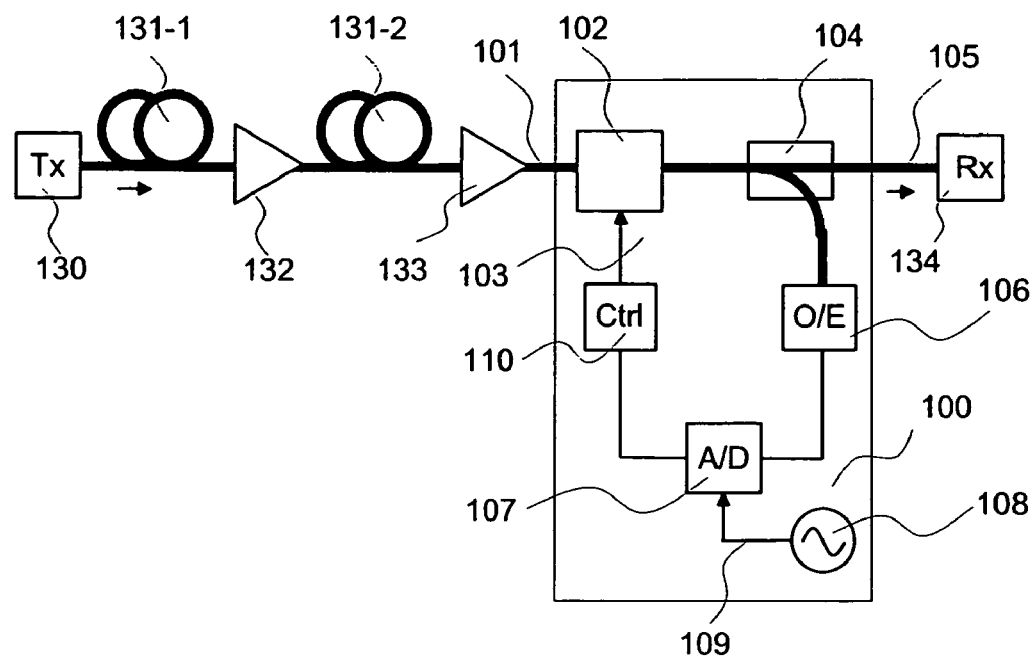
FIG. 7 is a block diagram showing a second embodiment of the present invention.

FIG. 7 shows a second embodiment of the present invention and illustrates the configuration of an optical transmitter according to the present invention. An optical signal from an optical transmitter 130 is transmitted through an optical fiber transmission line 131-1, then amplified as an optical signal by an optical repeater 132 consisting of an optical amplifier like an optical fiber amplifier and transmitted again through an optical fiber transmission line 131-2, amplified by an optical preamplifier 133 and sent to an automatic chromatic dispersion compensator (or PMD compensator) 100 according to the present invention. The optical signal which has undergone waveform deterioration compensation is sent to an optical receiver 134 where it is reconverted into an electric data signal. In this arrangement, there is no communication of electric signals between the automatic chromatic dispersion compensator 100 and the optical receiver 134 and they can be completely independent from each other. This is advantageous in that, when the automatic chromatic dispersion compensator 100 is a general-purpose product which can cope with multi bit rates, the number of products for maintenance or in stock may be reduced or it can be a product independent from the receiver 134. Another advantage is that when the automatic chromatic dispersion compensator 100 is located not just before the optical receiver 134 but in a desired position in the optical fiber transmission line, for example just after the optical repeater 132, it is possible to compensate for waveform distortion during transmission and extend the transmission distance.

The optical amplifiers used in this embodiment such as the optical repeater and the optical preamplifier may be optical fiber amplifiers which use a rare earth such erbium or Raman amplifiers or semiconductor optical amplifiers, which may be inserted anywhere as necessary.

Figure 8:
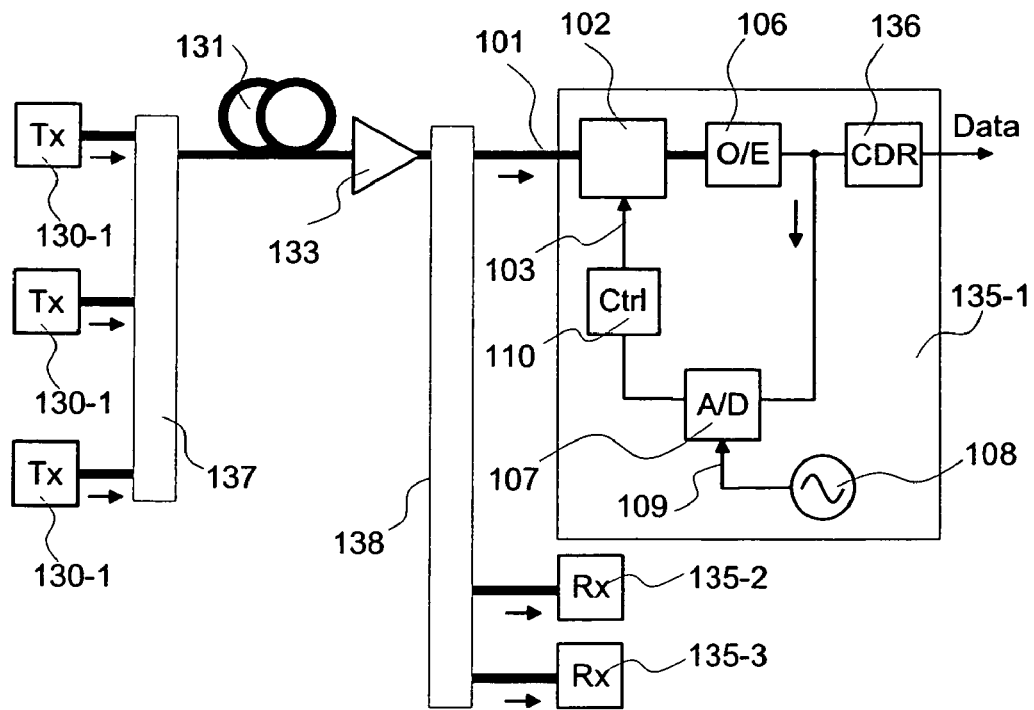
FIG. 8 is a block diagram showing a third embodiment of the present invention.

FIG. 8 shows a third embodiment of the present invention and exemplifies that the present invention is applied to a wavelength division multiplexing system and incorporated in an optical receiver. Optical signals with different wavelengths λ1, λ2 and λ3 from optical transmitters 130-1, 130-2 and 130-3 are multiplexed by an optical wavelength multiplexer 137 and transmitted through a single optical fiber transmission line 131, then amplified by an optical preamplifier 133 before being demultiplexed into separate signals with wavelengths λ1, λ2 and λ3 by an optical wavelength demultiplexer 138. These different wavelength optical signals are respectively sent to automatic chromatic dispersion compensation optical receivers 135-1, 135-2 and 135-3 which incorporate automatic chromatic dispersion compensators (or PMD compensators) according to the present invention. In this configuration, an optical detector 106 is also used as an optical detecting section of an optical receiver for digital data reception, thereby decreasing the number of components for cost reduction. An electric signal from the optical detector 106 is divided into two signals and one of them is sent to a clock and data regenerator 136 where a digital data signal is regenerated. The other signal is sent to an A/D converter 107 as in the aforementioned embodiments and used for amplitude sampling.

Figure 9:
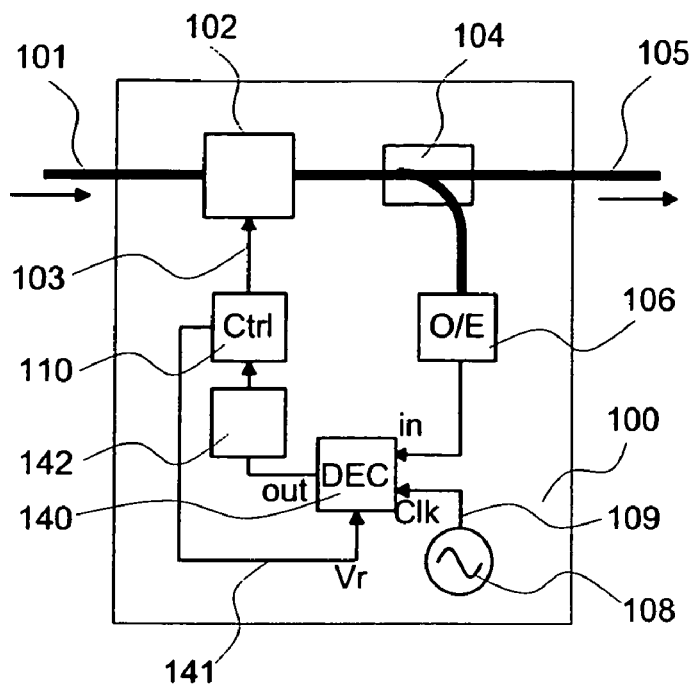
FIG. 9 is a block diagram showing a fourth embodiment of the present invention.

FIG. 9 shows a fourth embodiment of the present invention and exemplifies that the A/D converter 107 in the aforementioned embodiments is replaced by a variable decision circuit 140 to improve the sampling circuit implementability. With the current technology, it is slightly difficult from the viewpoint of cost to implement an A/D converter whose sampling speed exceeds several Gigahertz but a decision circuit with an operation clock speed in excess of 50 Gigahertz is relatively easily implemented. In this configuration, the waveform of an electric signal from the optical detector 106 is sent to the variable decision circuit 140 and converted into a digital signal with an amplitude of 0 or 1 at a time as indicated by an asynchronous sampling clock 109 generated by a clock source 108 before being sent to the control circuit 110 through an integrator 142.

The control circuit 110 outputs a decision level reference signal 141 and changes the decision level of the variable decision circuit 140 more slowly than the data signal bit rate and asynchronous clock 108. For example, if the decision level reference signal 141 has amplitude value Vr, the probability of appearance of amplitude 1 in the digital data sent from the decision circuit 140 is equal to the probability that the input signal amplitude value exceeds Vr. Hence, an accumulated histogram for input signal amplitudes can be obtained by slowly sweeping with Vr from the lower limit to the upper limit in the waveform amplitude range to investigate the probability that the output signal of the decision circuit 140 is 1. When the integral time constant of the integrator 142 is set to a level which is much slower than the above sampling speed or much faster than the above sweeping speed, the voltage of the signal from the integrator 142 corresponds to the probability that the output signal from the decision circuit 140 becomes 1. Since the amplitude histogram can be calculated by differentiation of this accumulated histogram, this configuration has the same effect as the above configuration in which the A/D converter is a sampling circuit.

The integrator 142 may be implemented in another form as far as it makes an output which corresponds to the probability of amplitude 0 or 1 in output data from the variable decision circuit 140. For example, it may be implemented in the form of a high-speed counter which counts times of amplitude 1 and outputs the count. In addition, the integral operation may be performed inside the control circuit as necessary.

Figure 10:
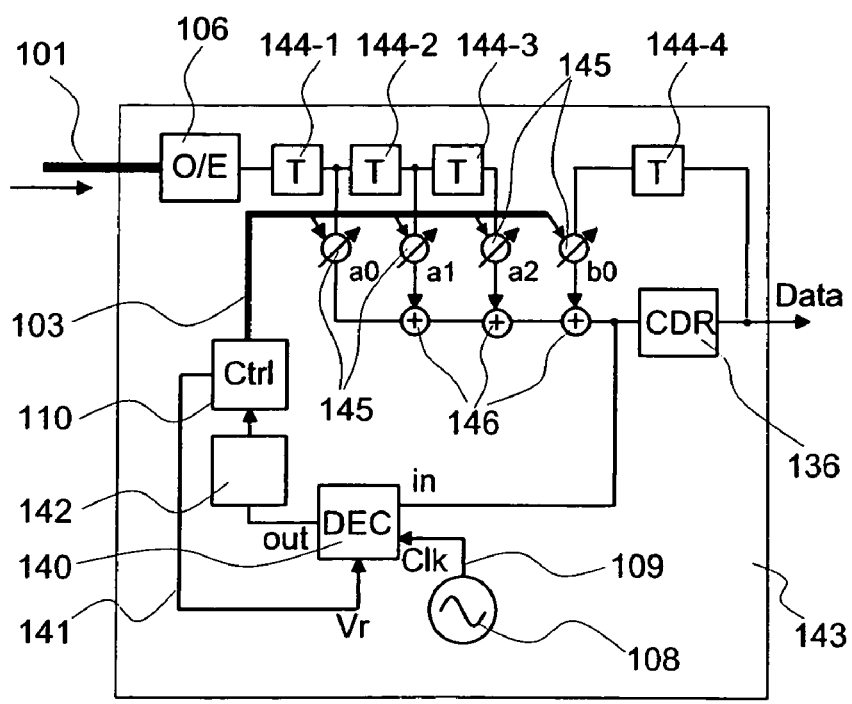
FIG. 10 is a block diagram showing a fifth embodiment of the present invention.

FIG. 10 shows a fifth embodiment of the present invention and exemplifies that a variable electric signal waveform deterioration compensation circuit compensates for received waveform deterioration. As the variable electric signal waveform deterioration compensation circuit, this embodiment uses a transversal filter and a decision feedback equalizer. The 3-tap transversal filter consists of three 1-bit delay circuits 144-1 to 144-3 cascade-connected after the output section of the optical detector 106, three weighting circuits 145 which branch part of the output signals from the bit delay circuits and multiply them by weighting factors a0 to a2, and two adders 146 which perform addition of output signals from these three weighting circuits. The 1-tap decision feedback equalizer consists of a 1-bit delay circuit 144-4 which delays data as decided and regenerated by a clock data regenerator 136 and feeds it back, a weighting circuit 145 with weight b0, and one adder 146.

The electric signal which has been obtained from the optical detector 106 is subjected to waveform equalization by the first transversal filter which functions as a linear filter. At the same time, it is subjected to non-linear equalization by feedback and addition of part of the post-decision digital signal after the clock data regenerator. The control circuit 110 controls these waveform equalization characteristics and frequency characteristics by varying the weight of the weighting circuit 145 so as to minimize the amount of waveform deterioration as detected by the asynchronous waveform deterioration detecting section in the present invention which is composed of the variable decision circuit 140, clock source 108, integrator 142 and control circuit 110. This control algorithm is almost equivalent to the aforementioned maximum/minimum control. As can be understood from the abovementioned, the present invention is also effective in controlling the electric compensation circuitry and in that case, it is possible to compensate for many waveform deterioration factors including inter-symbol interference inherent in transmitted waveform as well as chromatic dispersion, polarization mode dispersion, and bandwidth deterioration.

Figure 11:
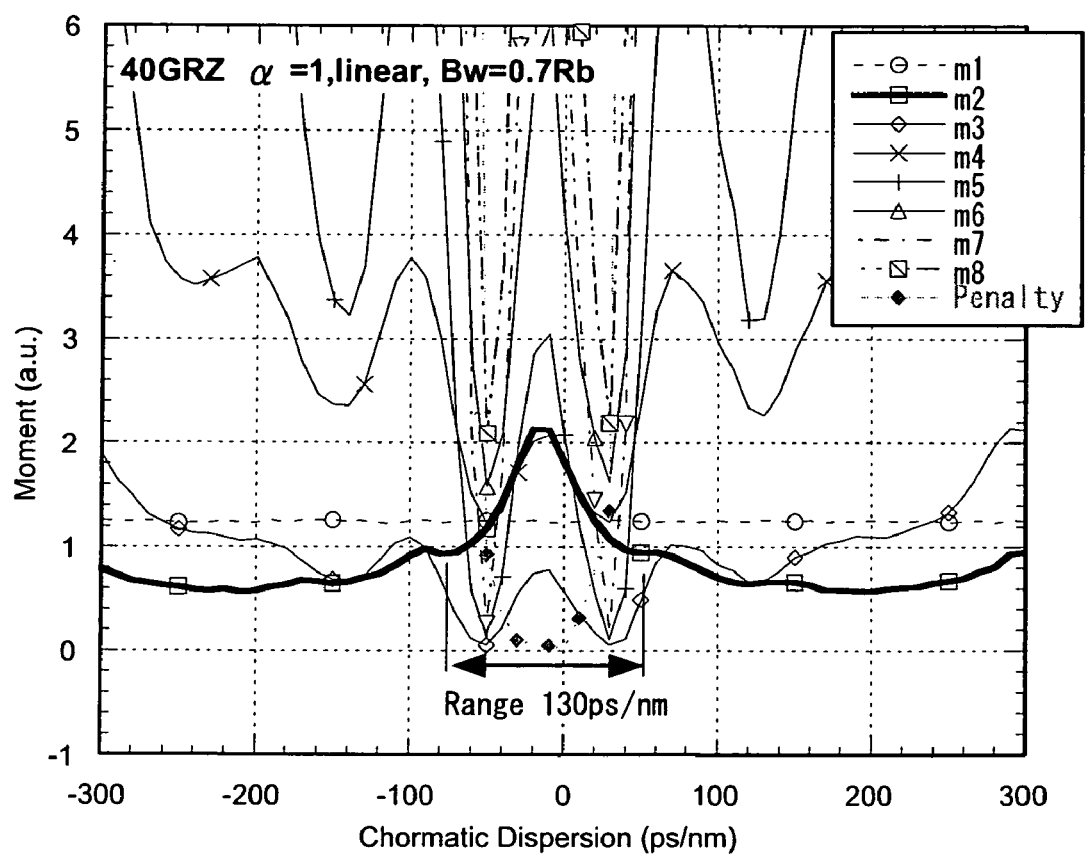
FIG. 11 shows the relation between the amount of chromatic dispersion and nth moment for RZ modulated optical signals.

FIG. 11 shows the relation between chromatic dispersion and nth moment in the present invention where the optical signal is RZ-modulated. The characteristics of waveform deterioration detection are quite different from those in case of NRZ modulation, namely the nth moment curves are largely waving cyclically. Therefore, the control range can be made approx. 130 ps/nm, or 1.6 times wider than in the clock extraction system by maximizing the second-moment (indicated by bold line), though the detection range is narrower than in case of NRZ modulation.

The waveform deterioration detection ranges as shown in FIG. 4 and FIG. 11 can be improved to a large extent by adequately decreasing the frequency bandwidth of the path from the optical detector 106 to the sampling circuit (A/D converter 107 or variable decision circuit 140) in the aforementioned embodiments. FIGS. 12A and 12B show examples of reduction of the above bandwidth to a quarter of the signal bit rate in case of receiving NRZ and RZ optical signals respectively.

According to the Nyquist theorem, the bandwidth must be at least one half of the bit rate in order to receive a digital signal without distortion; however, in the present invention, the bandwidth of the waveform deterioration detecting section is set to a level lower than this value so that the high frequency component of the signal is cut to make the waveform less steep. As a result, as seen from both the figures, change in moments which results from change in chromatic dispersion is very gradual where the detection range with a single-peak feature is substantially expanded and the moment components which were unusable previously can be used for control. The reason for this is that the high frequency component which might cause sudden waveform change is lost by bandwidth reduction. At the same time, there is an effect that the noise component decreases. For example, in case of NRZ signals, the waveform deterioration detection range for fourth moment minimum control is 900 ps/nm or more, or about nine times wider than in the conventional method, demonstrating that this approach is highly effective. In case of RZ signals, when the detection bandwidth is limited, the waveform looks like an NRZ signal waveform and the detection characteristics considerably change, suggesting a higher effectiveness. For example, in case of second moment maximum control, the range is approx. 550 ps/nm, or seven times wider than in the conventional method. Also, minimum control of fourth or higher even moments or odd moments can be applied.

Figure 13:
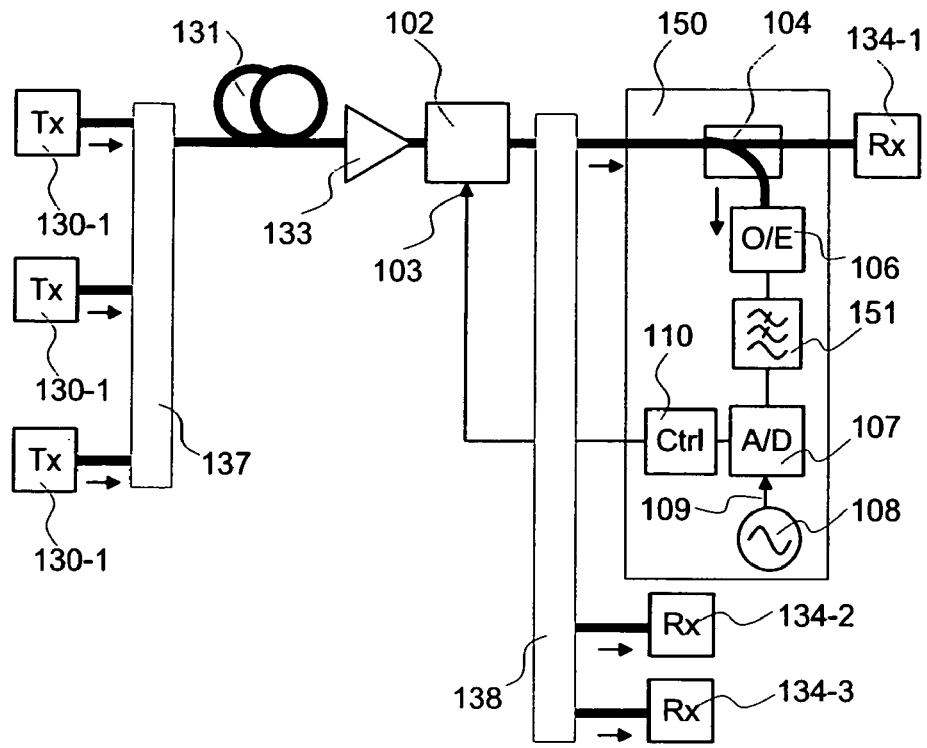
FIG. 13 is a block diagram showing a sixth embodiment of the present invention.

FIG. 13 shows a sixth embodiment of the present invention, illustrating an example of compensation for wavelength multiplexed signals. In this example, a chromatic dispersion compensator 102 is inserted just before an optical wavelength demultiplexer 138 so that deteriorations of plural optical signals are collectively compensated for before they are demultiplexed. This kind of compensation can be achieved by the use of a chromatic dispersion compensator having periodicity with respect to wavelength such as an optical etalon filter or optical transversal filter or a compensator with a sufficiently wide wavelength range. A waveform deterioration compensator 150 according to the present invention is located just before an optical receiver 134-1 which copes with optical signals with wavelength λ1 and a chromatic dispersion compensator 102 is controlled by a control signal 103 obtained from the control circuit 110. In this case, the chromatic dispersion compensator 102 operates in a way to optimize the waveform of a received signal with wavelength λ1 and at the same time, compensation for chromatic dispersion of signals with wavelengths λ2 and λ3 is made and better received waveforms are obtained.

In this embodiment, a lowpass filter 151 whose bandwidth is about a quarter of the bit rate is located between the optical detector 106 and the A/D converter 107 to reduce the bandwidth of the waveform deterioration detecting section for the purpose of improving the detection characteristics as described above with reference to FIG. 12. This bandwidth reduction does not always require a component like a lowpass filter; instead, for the optical detector 106 or A/D converter 107, an inexpensive component with a narrow bandwidth may be purposely used for cost reduction. Because the purpose of the use of such a component for bandwidth reduction is to make the received waveform far less steep, high accuracy control is not necessary. Therefore, there is no problem with operation even when the bit rate of a received signal somewhat changes and it is also possible to cope with multi bit rates.

Figure 14:
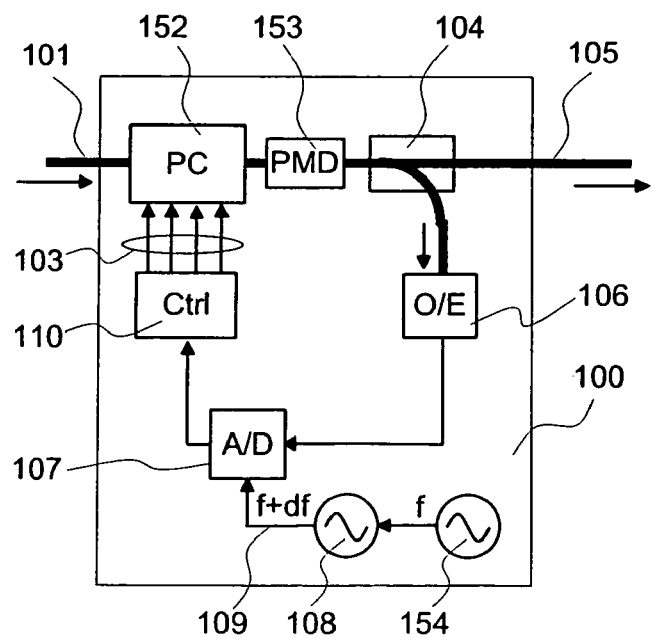
FIG. 14 is a block diagram showing a seventh embodiment of the present invention.

FIG. 14 shows a seventh embodiment of the present invention, illustrating an example of the configuration of a PMD compensator which copes with multi bit rates. In this example, the PMD compensator is configured with a PMD device 153 such as a polarization maintaining fiber located just after a polarization controller 152. Generally the polarization controller has two to four control input terminals; in this example, the control circuit 110 generates four control signals 103 for simultaneous control. In the PMD compensation circuit, a compensation function may be added or expanded as necessary to compensate for higher degree polarization mode dispersion, or a chromatic dispersion compensation circuit may be provided and simultaneously controlled. It is also possible that the PMD amount of the PMD device 153 is variable or that a multiple of the same compensation circuit as this one are connected. In this case, all variables are controlled by control signals 103 from the control circuit 110.

For the present invention to cope with multi bit rates, sampling timing for signals with plural bit rates must always be asynchronous with data signal bit timing. For example, if a sampling clock 109 generated by the clock source 108 is an integral multiple of the bit rate or 1/n of the bit rate (n: an integer), the problem arises that a proper amplitude histogram cannot be obtained because amplitudes are sampled only at regular bit times. Therefore, this embodiment uses a low frequency generator 154 to generate a low frequency signal with frequency Δf and shifts the clock frequency by df through this frequency cyclically in order to prevent synchronization with any bit rate signal.

The above variable asynchronous sampling technique can be used not only for PMD compensation but also for other types of compensation such as chromatic dispersion compensation without problems. The technique for asynchronization may be a technique of randomizing sampling timing or a technique of making sampling timing relatively prime to the range of bit rates which sampling input optical digital signals can have. In case of the latter technique, if the signal bit rate range is 9.95328 Gbps to 12.5 Gbps, the sampling frequency should be selected from a frequency range which is not an integral multiple or 1/n (n: an integer) of these values (for example, 6.25 GHz to 9.9 GHz); for example, 7 GHz may be selected. If these conditions cannot be satisfied, asynchronism can be ensured by detecting the received bit rate or frequency range and changing the sampling frequency to plural values.

Figure 15:
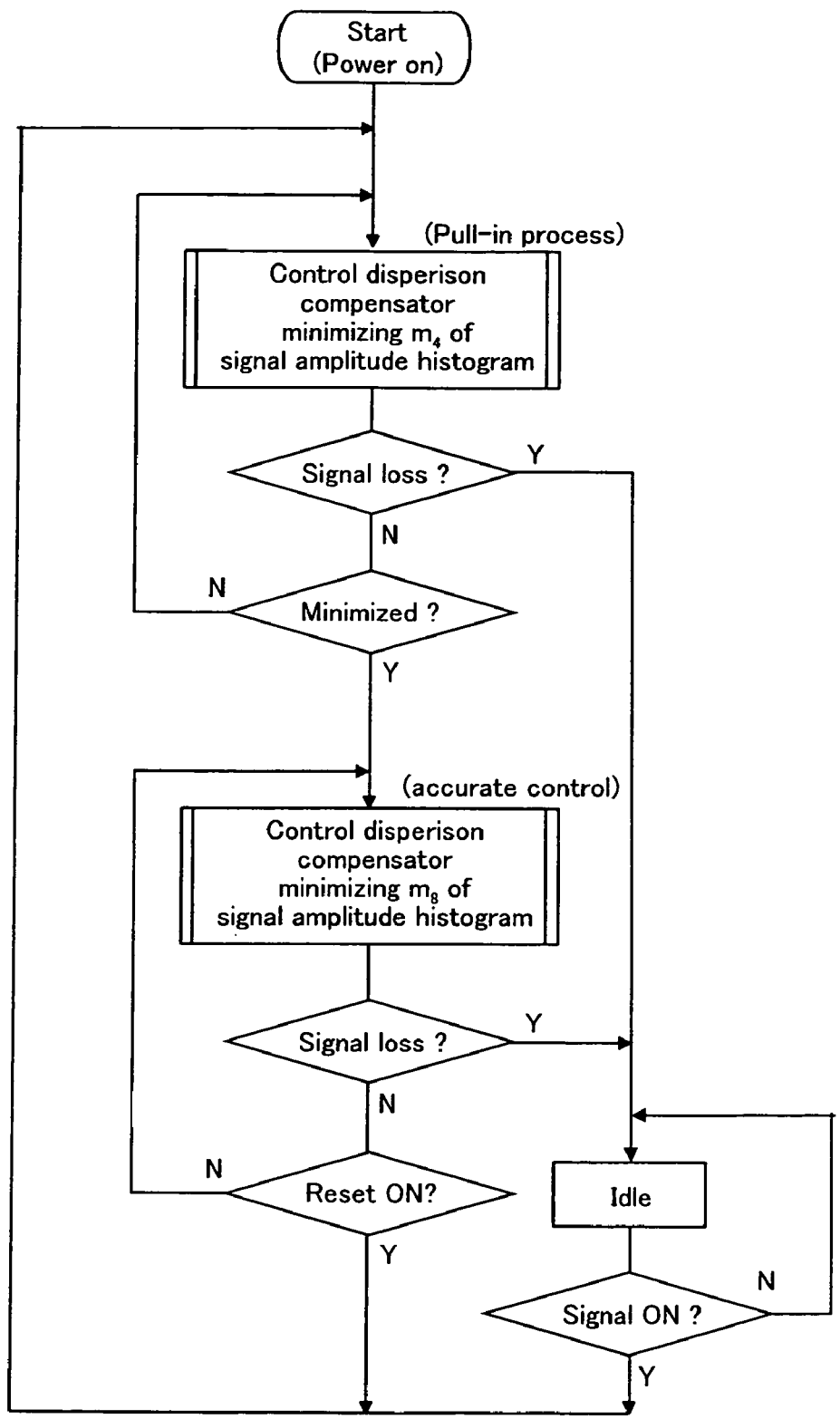
FIG. 15 is a flowchart showing control operation of the control circuit 110 in an eighth embodiment of the present invention.

FIG. 15 shows an eighth embodiment of the present invention and is a flowchart showing the control algorithm of the control circuit 110. In this example, as the power is turned on and the control circuit 110 starts control operation, the system goes through a Pull-in process in a Pull-in stage and, after the end of Pull-in, shifts to an accurate control process. Particularly upon change from the absence of an optical signal to the presence of an optical signal, for example, just after turning on the power, there may be a serious waveform deterioration and it is thus desirable for the control circuit 110 to use a moment with a wide pull-in detection range which is as low as possible (for example, fourth moment $m_4$ for NRZ waveforms), to perform Pull-in control. Afterward, or when it is decided that the minimum has been reached (Minimized?: YES in FIG. 15), or when the waveform deterioration is below a given amount, or when control signals from the control circuit 110 become steady, or after a given time has elapsed, it is decided that the Pull-in process is ended, and the control circuit 110 changes the algorithm to an accurate control algorithm which uses a moment with a higher detection sensitivity of waveform deterioration (for example, eighth moment $m_8$), thereby ensuring both the pull-in range and sensitivity for control. It is acceptable to have two or more algorithm options for selection, and for one control algorithm, it is possible to use a conventional clock maximum control algorithm, particularly an accurate control algorithm for which the pull-in range may be narrow.

In this example, even when an external reset signal is turned on under accurate control, pull-in operation is started again. This pull-in operation is intentionally performed in a situation that pull-in to a wrong control point is mistakenly done, or for the purpose of intentionally switching the signal to be received. This kind of reset signal can be generated when the number of bit errors exceeds a given value or can be generated in conjunction with the error signal of the transmission equipments.

In any embodiment, typically the one shown in FIG. 1, the control circuit 110 can detect the presence/absence of an optical signal based on the intensity of an output signal from the A/D converter 107 or variable decision circuit 140. Alternatively, a monitoring signal being sent as wavelength-multiplexed with an optical signal, an optical receiver or an external input signal may inform of the presence/absence of an optical signal. In FIG. 15, in case of signal loss, the control circuit 110 stops control (idle). Afterward, when the system receives an optical signal again (signal ON), it restarts operation from pull-in operation. This saves power consumption by stopping ineffective operation in case of signal loss, minimizes waveform deterioration which occurs while the system is down or temporarily out of operation, and minimizes pull-in time in receiving an optical signal again. If the time duration of signal loss is short or conditional change during signal loss is considered to be small (for example, a signal is restarted without repairing the machine or replacing a component), it is acceptable to restart control operation from the accurate control process.

As explained so far, through asynchronous waveform sampling, the present invention realizes a waveform deterioration compensator which copes with multi bit rates and provides a wider waveform deterioration detection range than in the conventional method. Since the waveform deterioration compensator copes with multi bit rates, it can be a general-purpose product independent from an optical receiver, contributing to reduction in the number of products. In addition, by replacing a deterioration compensation component as necessary, the waveform deterioration compensation circuit may be used for many types of compensation including PMD compensation, chromatic dispersion compensation and bandwidth deterioration compensation, contributing to reduction in the number of products and product cost. Since one waveform deterioration detecting circuit can be used to control many types of compensation including PMD compensation, chromatic dispersion compensation and bandwidth deterioration compensation, the system configuration is simplified and the cost is reduced.

Furthermore, since control is performed using statistical moments as universal normalization parameters which represent the states of statistical distributions, they are not influenced by change in gain or loss in the receiver attributable to signal level variation or ageing, decision timing error, the presence/absence of optical signal noise and the like and control signals can be easily calculated even for deteriorated waveforms which have lost an eye opening point and have too deteriorated to perform clock extraction. Consequently, the waveform deterioration detection range is six times wider than in the conventional method. Particularly when even moments are used, the control point is the point of minimum waveform deterioration and thus compensation can also be made for deterioration factors other than chromatic dispersion, polarization mode dispersion and bandwidth deterioration, such as self-phase modulation, a non-linear effect of an optical fiber.

When the bandwidth of the detecting section is reduced to below one half of the bit rate, the detection range for NRZ signals can be 1.5 times wider than in the above case. Particularly when this approach is applied for the RZ system, the detection characteristics can be the same as those for the NRZ system and the detection range can be broadened to the same level as for the NRZ system, and the same deterioration detecting circuit can be shared with NRZ signals.

It is preferable to prevent synchronization with a signal having any bit rate by making the sampling frequency relatively prime to all values which bit rates can have, or by randomizing the sampling timing, or by changing the sampling frequency to plural frequencies, or by varying the sampling frequency temporally.

By switching control algorithms, the waveform deterioration detection sensitivity and detection range can be both guaranteed and the automatic compensation accuracy can be improved while the automatic pull-in range of the automatic waveform deterioration compensator remains wide.

All publications, patents and patent applications cited in this specification are incorporated by reference into this specification.

INDUSTRIAL APPLICABILITY

According to the present invention, a signal waveform deterioration compensator which has a wide detection range and copes with a wide range of bit rates through a single circuit can be obtained.

The invention claimed is:

1. A signal waveform deterioration compensator comprising:
    an optical detector which converts an optical digital data signal into an electric digital data signal and outputs it;
    an independent sampling clock source which generates a cyclic clock signal having a frequency that is different than a frequency of the optical digital data signal;
    a sampling circuit which acquires an amplitude histogram by using the cyclic clock signal to sample an amplitude of said electric digital data signal asynchronously with a data signal bit timing;
    a signal waveform deterioration compensation circuit which receives said optical digital data signal or said electric digital data signal as a control signal to control an amount of signal waveform deterioration compensation; and
    a control circuit which generates a third or higher statistical moment as said control signal from an entirety of said histogram.

2. A signal waveform deterioration compensator comprising:
    an optical detector which converts an optical digital data signal into an electric digital data signal and outputs it;
    an independent sampling clock source which generates a cyclic clock signal having a frequency that is different than a frequency of the optical digital data signal;
    a sampling circuit which acquires an amplitude histogram by using the cyclic clock signal to sample an amplitude of said electric digital data signal asynchronously with a data signal bit timing;
    a variable signal waveform deterioration compensation circuit which receives said optical digital data signal or said electric digital data signal as an input; and
    a control circuit which generates a third or higher statistical moment as said control signal from an entirety of said histogram,
    wherein an amount of compensation by said variable signal waveform deterioration compensation circuit is controlled by the control signal generated by said control circuit.

3. The signal waveform deterioration compensator according to claim 2, characterized in that said variable signal waveform deterioration compensation circuit is a variable optical signal waveform deterioration compensation circuit which receives said optical digital data signal as an input.

4. The signal waveform deterioration compensator according to claim 2, characterized in that said variable signal waveform deterioration compensation circuit is a variable electric signal waveform deterioration compensation circuit which receives said electric digital data signal as an input.

5. The signal waveform deterioration compensator according to claim 2, characterized in that said variable signal waveform deterioration compensation circuit is a chromatic dispersion compensation circuit, a polarization mode dispersion deterioration compensation circuit or a bandwidth deterioration compensation circuit.

6. The signal waveform deterioration compensator according to claim 2, characterized in that said variable signal waveform deterioration compensation circuit includes a transversal filter or a decision feedback equalizer.

7. The signal waveform deterioration compensator according to claim 1, wherein the bit rates of said data signal have plural different values and the frequency of the cyclic clock signal used by said sampling circuit is relatively prime to all values which said bit rates can have, or
said frequency of the cyclic clock signal can be changed to plural different frequencies or said frequency of the cyclic clock signal varies temporally.

8. The signal waveform deterioration compensator according to claim 1, characterized in that a frequency bandwidth of a path from said optical detector to said sampling circuit is below one half of the bit rate of said data signal.

9. The signal waveform deterioration compensator according to claim 1, characterized in that said control circuit calculates the third or higher statistical moment in said histogram and controls the signal waveform deterioration compensation circuit so that the calculated statistical moment is a maximum, a minimum, or a fixed value.

10. The signal waveform deterioration compensator according to claim 9, wherein said data signal is of the NRZ (Non Return to Zero) type and said control circuit calculates the third or higher statistical moment and controls said signal waveform deterioration compensation circuit so as to make its value a fixed value or calculates a fourth or higher statistical moment and controls said signal waveform deterioration compensation circuit so as to minimize its value.

11. The signal waveform deterioration compensator according to claim 9, characterized in that said data signal is of the RZ (Return to Zero) type and said control circuit calculates the third or higher statistical moment and controls said signal waveform deterioration compensation circuit so as to maximize its value or calculates a fourth or higher statistical moment and controls said signal waveform deterioration compensation circuit so as to minimize its value.

12. The signal waveform deterioration compensator according to claim 9, wherein said control circuit switches control algorithms so as to control said signal waveform deterioration compensation circuit according to the third or higher statistical moment after turning on the power or receiving an external command signal or upon change from absence of an optical signal to presence of an optical signal, and then controls said signal waveform deterioration compensation circuit using a fourth or higher statistical moment or a control signal generated by another method.

13. The signal waveform deterioration compensator according to claim 2, wherein the bit rates of said data signal have plural different values and the frequency of the cyclic clock signal used by said sampling circuit is relatively prime to all values which said bit rates can have, or
said frequency of the cyclic clock signal can be changed to plural different frequencies or said frequency of the cyclic clock signal varies temporally.

14. The signal waveform deterioration compensator according to claim 2, characterized in that a frequency bandwidth of a path from said optical detector to said sampling circuit is below one half of the bit rate of said data signal.

15. The signal waveform deterioration compensator according to claim 2, characterized in that said control circuit calculates the third or higher statistical moment in said histogram and controls the signal waveform deterioration compensation circuit so that the calculated statistical moment is a maximum, a minimum, or a fixed value.

16. The signal waveform deterioration compensator according to claim 15, characterized in that said data signal is of the NRZ (Non Return to Zero) type and said control circuit calculates the third or higher statistical moment and controls said signal waveform deterioration compensation circuit so as to make its value a fixed value or calculates a fourth or higher statistical moment and controls said signal waveform deterioration compensation circuit so as to minimize its value.

17. The signal waveform deterioration compensator according to claim 15, characterized in that said data signal is of the RZ (Return to Zero) type and said control circuit calculates the third or higher statistical moment and controls said signal waveform deterioration compensation circuit so as to maximize its value or calculates a fourth or higher statistical moment and controls said signal waveform deterioration compensation circuit so as to minimize its value.

18. The signal waveform deterioration compensator according to claim 15, wherein said control circuit switches control algorithms so as to control said signal waveform deterioration compensation circuit according to the third or higher statistical moment after turning on the power or receiving an external command signal or upon change from absence of an optical signal to presence of an optical signal, and then controls said signal waveform deterioration compensation circuit using a fourth or higher statistical moment or a control signal generated by another method.

* * * * *